No. 839,098. PATENTED DEC. 25, 1906.
A. BIRCHALL.
MEANS FOR SECURING FLEXIBLE TIRES TO MOTOR CAR AND LIKE WHEEL RIMS.
APPLICATION FILED JAN. 6, 1906.

UNITED STATES PATENT OFFICE.

ALFRED BIRCHALL, OF LIVERPOOL, ENGLAND.

MEANS FOR SECURING FLEXIBLE TIRES TO MOTOR-CAR AND LIKE WHEEL RIMS.

No. 839,098.  Specification of Letters Patent.  Patented Dec. 25, 1906.

Application filed January 6, 1906. Serial No. 294,966.

*To all whom it may concern:*

Be it known that I, ALFRED BIRCHALL, a subject of the King of Great Britain and Ireland, residing at Liverpool, in the county of Lancaster, England, have invented Improvements in and Relating to Means for Securing Flexible Tires to Motor-Car and Like Wheel Rims, of which the following is a specification.

This invention has reference to simple means for securing pneumatic or other flexible tires to wheels of motor-cars and other vehicles, and has for its object to provide a simple arrangement whereby it is only necessary to withdraw, say, one locking-bolt, after which a retaining-flange on one side of the wheel-rim can be slightly rotated and at once removed, thus allowing the complete flexible tire to be drawn off the wheel-rim without straining the retaining edges, as is the case when removing a pneumatic-tire casing from the usual form of grooved wheel-rim.

In my arrangement no special tools are required, such as prizing-levers, which are apt to damage the inner air-tube unless carefully handled, and, further, the arrangement is such that should the air-tube burst and be beyond repair when on the road it, with the tire-casing, may be bodily removed from the wheel-rim, and in substitution for the inflated air-tube the tire-casing can be tightly packed to its proper size with any material that may be at hand—such as straw, old rope, earth, sand, or the like—so that the tire can be replaced on the rim and the wheel run in its uninflated condition until repairs can be effected or a new air-tube fitted, there being no risk of the casing spreading out on the road and becoming cut by the flanges of the wheel-rim, as would otherwise occur when run in a deflated condition. The tire when packed may be slid bodily into the wheel-rim and the loose retaining-flange replaced. In case of accident a spare solid-rubber ring to take the place of the pneumatic tube may be carried, or a solid-rubber tire of practically the same section as the pneumatic tire when inflated may be employed when the tire-casing is seriously damaged and cannot be used.

Figure 1:
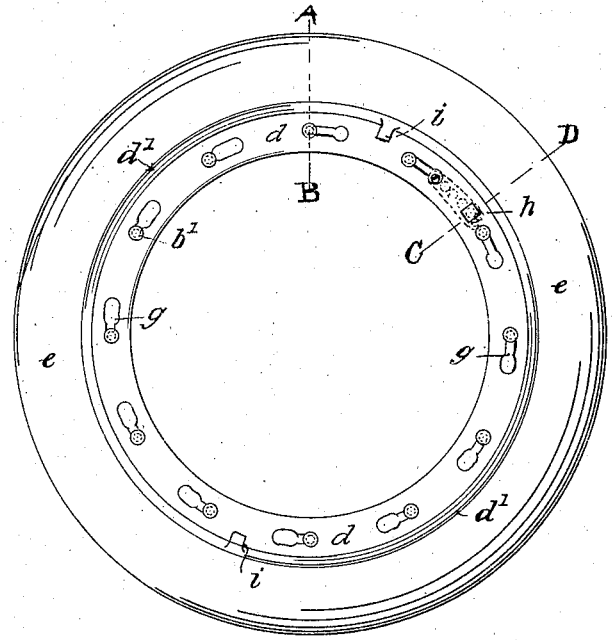
Figure 3:
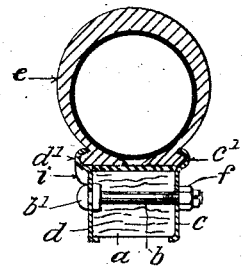
Figure 4:
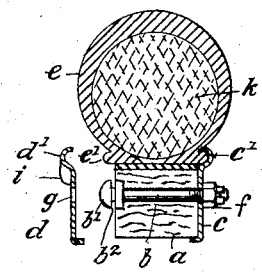
Figure 5:
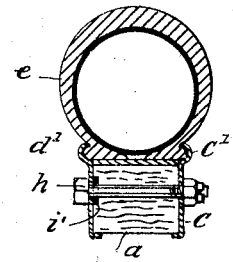
Figure 2:
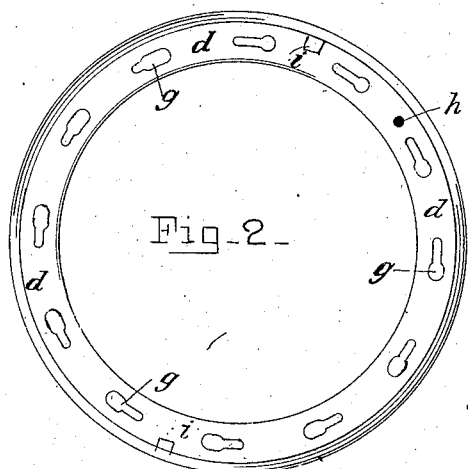

In the accompanying illustrative drawings, Figure 1 shows in side elevation the rim or felly of a wheel suitable for a motor-vehicle, having a pneumatic tire arranged and secured in place according to one arrangement for carrying this invention into practice. Fig. 2 is a side elevation showing the removable ring-flange separately. Fig. 3 is a cross-section, to an enlarged scale, corresponding to the line A B of Fig. 1. Fig. 4 is a similar view to Fig. 3, showing the air-tube removed, as in consequence of damage thereto, packing being substituted therefor. Fig. 5 is a cross-section, to an enlarged scale, corresponding to the line C D of Fig. 1; and Fig. 6 shows a plate with holes formed therein and inserted in the wooden wheel-rim for levering over the removable ring-flange.

The wheel rim or felly $a$, which is preferably of wood, is formed with a number of holes, which are bored at equal distances apart around the rim and are adapted to receive screw-threaded bolts or studs $b$ for securing to the sides of the rim $a$ two annular flanges $c$ and $d$, which may be stamped out of sheet-steel to the desired section. Each of the ring-flanges $c$ and $d$ is made somewhat larger in diameter externally than the wheel-rim $a$ and has is outer peripheral edge (which projects beyond the wheel-rim, owing to its larger diameter) suitably curved over, as at $c'$ and $d'$, to engage the dovetailed shape of the retaining edge $e'$ of the tire-casing $e$. The flanges $c$ and $d$ therefore form the retaining-flanges for the tire.

One of the flanges—viz., $c$—is permanently secured to the side of the wheel-rim $a$ which is the nearer to the vehicle-body in use, as by means of the bolts $b$, which are provided with locking-nuts $f$. The other flange $d$ is removable and has suitable holes $g$, wider at one end than at the other, formed therein to correspond to the bolts $b$, the heads $b'$ and sufficient of the body part of the bolts projecting past the side of the wooden rim or felly $a$ to allow the flange $d$ to be slipped over the bolt-head and to be slightly rotated, so that the narrower parts of the holes $g$ will pass under the heads of the bolts. The flange $d$ is locked in the position into which it is so turned by inserting a locking-bolt $h$ through holes in the removable flange $d$, the wheel-rim $a$, and the fixed ring-flange $c$, and so binding the flanges and felly together. (See Fig. 5.)

Figure 6:
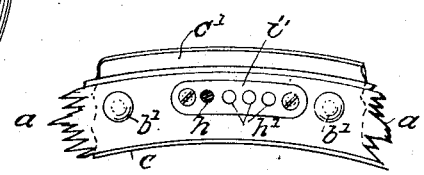

To assist in partly rotating the flange $d$ into a position from which it can be removed laterally free of the projecting bolts $b$, a projection $i$ is provided upon the flange $d$, and a suitable plate $i'$, having a number of holes $h'$ formed in it, as shown in Fig. 6, is inserted flush with the wooden wheel-rim, (see Fig. 5,) and corresponding therewith a hole is formed in the ring-flange, which hole may conveniently be, as represented, the hole intended for the locking-bolt $h$, the arrangement being such that the end of a screwdriver or other convenient tool may be inserted through the said hole, so as to be engaged in one or other of the holes $h'$ for the purpose of prizing or levering the ring-flange $d$ along in either direction for the required angular distance.

Each bolt-head $b'$ has a groove $b^2$, into which the removable flange $d$ is adapted to fit. This is shown clearly in Figs. 3 and 4 and is for the purpose of permitting the bolts to be drawn and locked tightly in place without exerting any clamping action on the flange $d$. It will be observed that the inner portions of the heads of the bolts are embedded in the rim sufficiently to bring the grooves in the heads in line with the surface of the rim, so that the movable ring shall lie closely against said surface.

It will thus be understood that after unfastening and removing the locking-bolt $h$ the flange $d$ can be moved round until the enlarged parts of the holes $g$ therein are opposite the heads of the retaining-bolts $b$, and it can then be slipped over the said heads and the complete flexible tire removed from the wheel-rim. As shown in Fig. 4, an india-rubber ring $k$ has been substituted for a damaged air-tube.

The number and arrangement of the retaining-bolts will of course be varied to suit various classes of wheel-rims without departure from the essential features of my invention, and the pitch of these bolts or studs may be slightly varied from that of the holes in the removable ring-flange, so that instead of the heads of all the bolts engaging with the ring-flange simultaneously they may each engage alternately or in order as the rim is moved slightly around.

As shown in Fig. 2, the lengths of the enlarged portions of the slotted holes $g$ in the removable ring-flange $d$ are gradually increased from one hole to the next and the smaller portions thereof correspondingly diminished, the full lengths of the said holes being the same throughout.

As shown, one series of bolts $b$ is made to serve for securing both the fixed and the removable ring-flanges $c$ $d$, the heads $b'$ being formed, as described, with a groove $b^2$, in which the removable ring-flange $d$ is adapted to be engaged, and the fixed ring-flange $e$ being secured by means of the nuts $j$, fitted on the screwed ends thereof.

What I claim is—

1. In a vehicle-wheel, a rim or felly, a removable tire, means fixed to said rim and adapted to engage said tire at one side of said rim or felly, grooved headed projections on the other side of said rim or felly, and a removable ring engaging the grooves in the heads of said projections and the other side of said tire and adapted after being rotated through a small angle to become disengaged from said headed projections so that it can be removed laterally from the wheel rim or felly.

2. In a vehicle-wheel, a rim or felly, a removable tire, means fixed to said rim and adapted to engage said tire at one side of said rim or felly, grooved headed projections on the other side of said rim or felly, a removable ring engaging the grooves in the heads of said projections and the other side of said tire and adapted after being rotated through a small angle to become disengaged from said headed projections so that it can be removed laterally from the wheel rim or felly, and means whereby said removable ring is fixed in the tire-securing position but can be liberated therefrom.

3. In a vehicle-wheel, a rim or felly, a removable tire, means fixed to said rim and adapted to engage said tire at one side of said rim or felly, grooved headed projections on the other side of said rim or felly, and a removable ring which is formed with openings each having a narrow and a wide part and which engages the other side of said tire and also the grooves in the heads of said projections which enter through the narrow parts of said openings, and which is further adapted, by being rotated through a small angle, to bring said projections into the wide parts of said openings and so become disengaged from the heads thereof.

4. In a vehicle-wheel, a rim or felly, a removable tire, means fixed to said rim or felly and adapted to engage said tire at one side of said rim or felly, headed bolts extending through said rim or felly and having their heads grooved, nuts on said side of said rim or felly and securing said bolts therein, and a removable ring engaging the grooves in the heads of said bolts and the other side of the tire and adapted after being rotated through a small angle to become disengaged from said bolt-heads so that it can be moved laterally from the wheel rim or felly.

5. In a vehicle-wheel, a rim or felly, a removable tire, a removable flange fixed to said rim or felly and adapted to engage said tire at one side of said rim or felly, headed bolts formed with grooves in their heads and extending through said flange and rim or felly, nuts on said side of said rim or felly and securing said bolts therein and the flange to the rim, and a removable ring engaging in said grooves in the bolt-heads and also engaging the other side of the tire and adapted after being rotated through a small angle to become disengaged from said bolt-heads so that it can be moved laterally from the wheel rim or felly.

6. In a vehicle-wheel, a rim or felly, a removable tire, a removable flange fixed to said rim and adapted to engage said tire at one side of said rim or felly, grooved headed projections on the other side of said rim or felly, a removable ring engaging the grooved heads of said projections and the other side of said tire and adapted after being rotated through a small angle to become disengaged from said headed projections so that it can be removed laterally from the wheel rim or felly, and a projection formed on said removable ring whereby it can be moved from one position to another.

7. In a vehicle-wheel, a rim or felly, a removable tire, means fixed to said rim and adapted to engage said tire at one side of said rim or felly, headed projections on the other side of said rim or felly, a removable ring engaging the heads of said projections and the other side of said tire and adapted after being rotated through a small angle to become disengaged from said headed projections so that it can be removed laterally from the wheel rim or felly, and a plate having one or more holes formed in it fitted into the wheel rim or felly, the removable ring being formed with an opening so that a tool can be inserted in a hole of the said plate for the purpose of prizing or levering the removable ring from one position to another.

8. In a vehicle-wheel, a rim or felly, a removable tire, means fixed to said rim and adapted to engage said tire at one side of said rim or felly, headed projections on the other side of said rim or felly, and a removable ring which is formed with openings each having a narrow and a wide part and which engages the other side of said tire and also the heads of said projections which enter through the wide parts of said openings, and which is further adapted, by being rotated through a small angle, to bring said projections into the narrow parts of said openings and thus lock the ring to the felly, the wide portions of the openings in said removable ring being of different lengths and the headed projections being arranged at a pitch differing from that of the said openings so that in rotating the ring to disengage it the headed projections will become disengaged from the removable ring successively.

9. In a vehicle-wheel, a rim, a removable tire, a flange fixed to said rim at one side and adapted to engage said tire at that side, headed projections on the other side of said rim, a removable ring-flange engaging the heads of said projections and the other side of said tire and adapted to be disengaged from said projections by a slight rotative movement of the wheel, a plate having a series of holes and secured to the rim back of the movable ring-flange, said ring-flange being provided with an opening in register with the openings in said plate, and a removable lock-bolt passing through the hole in the ring-flange and through one of the holes in said plate.

Signed at 26 Chapel street, Liverpool, in the county of Lancaster, England, this 21st day of December, 1905.

ALFRED BIRCHALL.

Witnesses:
F. M. C. SCOTT,
H. WATSON.